United States Patent
Tehranchi et al.

(10) Patent No.: US 6,809,792 B1
(45) Date of Patent: Oct. 26, 2004

(54) SPECTRAL WATERMARKING FOR MOTION PICTURE IMAGE DATA

(75) Inventors: Babak Tehranchi, Rochester, NY (US); Timothy J. Tredwell, Fairport, NY (US); Paul W. Jones, Churchville, NY (US)

(73) Assignee: Eastman Kodak Company, Rochester, NY (US)

( * ) Notice: Subject to any disclaimer, the term of this patent is extended or adjusted under 35 U.S.C. 154(b) by 801 days.

(21) Appl. No.: 09/685,832

(22) Filed: Oct. 9, 2000

(51) Int. Cl.[7] ............................................. G03B 21/32
(52) U.S. Cl. ...................... 352/85; 352/90; 352/133; 353/122
(58) Field of Search ........................... 352/40, 85, 90, 352/133; 348/744; 353/122

(56) References Cited

U.S. PATENT DOCUMENTS

| | | | |
|---|---|---|---|
| 4,644,422 A | 2/1987 | Bedini | |
| 5,530,759 A | 6/1996 | Braudaway et al. | |
| 5,809,139 A | 9/1998 | Girod et al. | |
| 5,875,249 A | 2/1999 | Mintzer et al. | |
| 5,912,972 A | 6/1999 | Barton | |
| 5,959,717 A | 9/1999 | Chaum | |
| 5,960,081 A | 9/1999 | Vynne et al. | |
| 6,018,374 A | * 1/2000 | Wrobleski | 348/744 |
| 6,031,914 A | 2/2000 | Tewfik et al. | |
| 6,037,984 A | 3/2000 | Isnardi et al. | |
| 6,044,156 A | 3/2000 | Honsinger et al. | |
| 6,069,914 A | 5/2000 | Cox | |

* cited by examiner

*Primary Examiner*—Rodney Fuller
*Assistant Examiner*—Arthur A Smith
(74) *Attorney, Agent, or Firm*—Norman Rushefsky

(57) ABSTRACT

An apparatus and method for forming a substantially invisible watermark or copy-deterrent pattern within a motion picture frame that utilizes spectral image data in order to apply a pattern that is not objectionable to a viewer, but that can be sensed and recorded by a video camera device. A digital watermark or copy deterrent pattern, message, animation, or obscuring effect can be formed to identify a legally distributed copy, degrade the quality of an illegally recorded copy, or expand the storage requirements for an illegally recorded copy using this technique. The pattern is applied using some combination of UV and IR light sources just outside the visible range, displayed on the movie screen. An illegally recorded copy may bear a visible watermark or copy-deterrent pattern which can be detected upon playback. A copy-deterrent pattern can also be used to make video compression techniques less effective, requiring that an illegally recorded copy require excessive amounts of storage media.

33 Claims, 7 Drawing Sheets

SPECTRAL WATERMARKING FOR MOTION PICTURE IMAGE DATA

FIELD OF THE INVENTION

This invention generally relates to a pattern display apparatus for motion pictures and more particularly relates to a method for marking a displayed motion picture image in order to discourage recording the image using a video camera.

BACKGROUND OF THE INVENTION

Movie piracy is a cause of substantial revenue loss to the motion picture industry. Illegally copied movies, filmed during projection with video cameras or camcorders and similar devices, are a significant contributing factor to revenue loss. Even the questionable quality of movies pirated in this fashion does not prevent them from broad distribution in the "black market", especially in some overseas markets, and on the Internet. As video cameras improve in imaging quality and become smaller and more capable, the threat of illegal copying activity becomes more menacing to motion picture providers. While it may not be possible to completely eliminate theft by copying, it can be advantageous to provide display delivery techniques that frustrate anyone who attempts to copy a motion picture using a portable video camera device.

It is known to provide a distinct symbol or watermark to an original still image as a means of image or copy identification, such as in order to authenticate a copy. As examples, U.S. Pat. No. 5,875,249 (Mintzer et al.), U.S. Pat. No. 6,031,914 (Tewfik et al.), and U.S. Pat. No. 5,912,972 (Barton) disclose methods of applying a perceptually invisible watermark to image data as verification of authorship or as evidence that an image has not been altered. However, where such methods identify and validate image data, they provide no direct means of protection against copying an image, such as using a conventional scanner and color printer. In contrast, U.S. Pat. No. 5,530,759 (Braudaway et al.) discloses providing a visible, color correct watermark that is generated by altering brightness characteristics but not chromaticity of specific pixels in the image. But the approach used in U.S. Pat. No. 5,530,759 could be objectionable if used for a motion picture, since the continuing display of a watermark on film could annoy an audience and adversely affect the viewing experience.

The above examples for single images illustrate a key problem: an invisible watermark identifies but does not adversely affect the quality of an illegal copy, while a visible watermark can be distracting and annoying. With video and motion picture images, there can be yet other problems with conventional image watermarking. For example, U.S. Pat. No. 5,960,081 (Vynne et al.) discloses applying a hidden watermark to MPEG data using motion vector data. But this method identifies and authenticates the original compressed data stream and would not provide identification for a motion picture that was copied using a camcorder. Other patents, such as U.S. Pat. No. 5,809,139 (Girod et al.), U.S. Pat. No. 6,069,914 (Cox), and U.S. Pat. No. 6,037,984 (Isnardi et al.) disclose adding an imperceptible watermark directly to the discrete cosine transform (DCT) coefficients of a MPEG-compressed video signal. These methods, however, provide a watermark that is primarily detectable in the compressed image data itself. If such watermarked images are subsequently recompressed using a lossy compression method (such as by a camcorder, for example) or are modified by some other image processing operation, the watermark may no longer be detectable.

The watermarking schemes disclosed in the patents listed above add a watermark to the compressed bit stream of an image or image sequence. Alternatively, there are other watermarking schemes that add the watermark to the image data itself, rather than to the compressed data representation. An example of such a scheme is given in U.S. Pat. No. 6,044,156 (Honsinger et al.), which discloses a spread spectrum technique using a random phase carrier. However, regardless of the specific method that is used to embed a watermark, there is always a concern that a watermarking method be robust, that is, able to withstand various "attacks" that can remove or alter the watermark. Some attacks may be deliberately aimed at the underlying structure of a given watermarking scheme and require detailed knowledge of watermarking techniques applied. However, most attack methods are less sophisticated, performing common modifications to the image such as using lossy compression, introducing lowpass filtering, or cropping the image, for example. Such modifications can be made when a video camera is used to capture a displayed motion picture. These methods present a constant threat that a watermark may be removed during the recording process.

The watermarking schemes noted above are directed to copy identification, ownership, or authentication. However, even if a watermarking approach is robust, provides copy control management, and succeeds in identifying the source of a motion picture, an invisible watermark may not be a sufficient deterrent for illegal copying.

As an alternative to watermarking, some copy deterrent schemes used in arts other than video or movie display operate by modifying a signal or inserting a different signal to degrade the quality of any illegal copies. The modified or inserted signal does not affect playback of a legally obtained manufactured copy, but adversely impacts the quality of an illegally produced copy. As an example of this principle, U.S. Pat. No. 4,644,422 (Bedini) discloses adding a degrading signal to discourage copying of audio recordings. An audio signal having a frequency at and above the high threshold frequency range for human hearing is selectively inserted into a recording. The inserted signal is not detectable to the listener. However, any unauthorized attempt to copy the recording onto tape obtains a degraded copy, since the inserted audio signal interacts adversely with the bias oscillator frequency of a tape recording head.

As a variation of the general method where a signal is inserted that does not impact viewability but degrades copy quality, U.S. Pat. No. 6,018,374 (Wrobleski) discloses the use of a second projector in video and motion picture presentation. This second projector is used to project an infrared (IR) message onto the display screen, where the infrared message can contain, for example, a date/time stamp, theater identifying text, or other information. The infrared message is not visible to the human eye. However, because a video camera has broader spectral sensitivity that includes the IR range, the message will be clearly visible in any video camera copy made from the display screen. The same technique can be used to distort a recorded image with an "overlaid" infrared image. While the method disclosed in U.S. Pat. No. 6,018,374 can be effective for frustrating casual camcorder recording, the method has some drawbacks. A more sophisticated video camera operator could minimize the effect of a projected infrared watermark using a filter designed to block infrared light. Video cameras are normally provided with some amount of IR filtering to compensate for silicon sensitivity to IR. With a focused watermark image, such as a text message projected using infrared light, retouching techniques could be applied to alter or remove a watermark, especially if the infrared signal can be located within frame coordinates and is consistent, frame to frame. A further drawback of the method disclosed in U.S. Pat. No. 6,018,374 relates to the infrared light source itself. Since an infrared lamp can generate significant amounts of heat, it may not be practical to project a watermark or copy deterrent image over a large area of the display screen using only an IR source.

Conventional methods such as those described above could be adapted to provide some measure of copy deterrence and watermarking for conventional as well as digital motion pictures. However, none of the methods noted above is wholly satisfactory, for the reasons stated. None of the existing copy protection or watermarking methods takes advantage of key characteristics of the digital motion picture environment. None of the above methods adequately provides a watermark or copy-deterrent marking that is not visually obtrusive during viewing, but at the same time can be recorded by a video camera.

The capability for encoding "passive" invisible digital watermarks within video data has been developed. However, there is a need for more aggressive watermark and copy-deterrent protection that utilizes digital motion picture data content and that takes advantage of digital projector technology. In a fully digital motion picture system, frames are projected at precise intervals (usually at $1/24$ or $1/30$ second) and the spectral content of each displayed pixel is known for each frame. Each displayed pixel on the screen can be individually addressed within any frame, and its spectral characteristics can be identified. This capability has, however, not been used for watermarking or for displaying a copy-deterrent pattern.

In order to reduce the amount of data that needs to be stored for a recorded image, video cameras employ some type of image compression, such as JPEG or MPEG familiar in the image compression arts. Video compression schemes of this type take advantage of image predictability between consecutive frames in order to reduce the overall size of stored data. For film producers and distributors, however, it can be seen that there would be advantages to using display techniques that render JPEG, MPEG, and similar compression schemes ineffective for video camera users attempting to copy a motion picture from a screen. Methods for minimizing the effectiveness of compression schemes would be advantageous for copy protection of a motion picture, whether the motion picture is stored and displayed from conventional film reels or from a digital data source.

Therefore, it can be seen that there is clearly a need for a method that allows watermarking and copy-deterrent marking of motion picture content, where the content is generated from film or from digital data. It would be most advantageous for a marking to be invisible to a viewer but recordable using a video camera. Further, it can be seen that there is a need for a method that uses the opportunity for control of timing and of individual screen pixel content that digital motion picture technology offers in order to defeat movie piracy using a video camera.

SUMMARY OF THE INVENTION

With the above description in mind, it is an object of the present invention to provide a pattern display apparatus for displaying a pattern within a projected motion picture image frame, the apparatus comprising:

(a) an infrared light (IR) source adapted to provide infrared light to a first plurality of individual regions within said projected motion picture image frame;

(b) an ultraviolet (UV) light source adapted to provide ultraviolet light to a second plurality of individual regions within said projected motion picture image frame.

It is a feature of the present invention that it is capable of selectively illuminating one or more individual regions within both first and second plurality of individual regions based on spectral content of projected pixels within the motion picture image frame. This gives the present invention, for example, the capability to provide a watermark or copy-deterrent pattern that is very nearly visible in areas of a frame having a predominantly blue or red color content. An embedded pattern could also be an encoded digital watermark that identifies origin, ownership, or display attributes of a motion picture, where such a watermark can be securely encoded and decoded and used for identification purposes.

A further feature of the present invention is the capability to randomize region selections for ultraviolet or infrared sources with each frame. This feature contributes to the robustness of any watermark or copy-deterrent effect applied, since it makes it difficult to re-create image content affected by the watermark or copy-deterrent effect, except possibly on a frame-by-frame basis.

It is an advantage of the present invention that it provides an apparatus and method for marking or obscuring an illegally captured copy without affecting the image quality of a valid viewing for a motion picture.

It is a further advantage of the present invention that it provides a method for displaying a copy-deterrent effect or watermarking of a motion picture that is transparent to a viewing audience.

It is a further advantage of the present invention that it provides a method that makes it impractical to generate and use a copy of a motion picture filmed using a video camera. Significantly, the present invention provides a method and apparatus that can be effective for both digital motion picture and conventional, film-based motion picture projection.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

Figure 1:
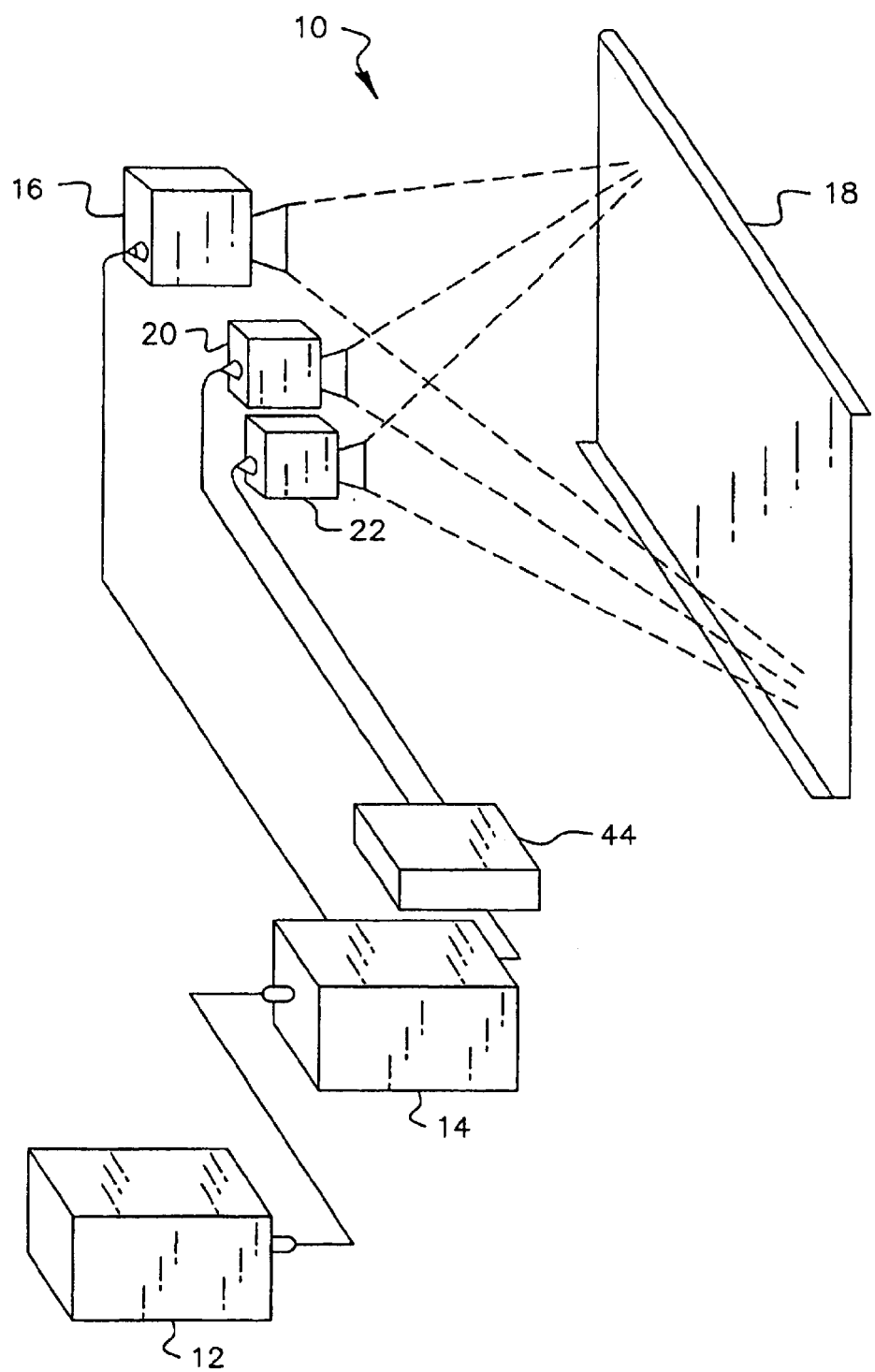
FIG. 1 is a schematic view showing placement of projector components in a preferred embodiment.

The present description is directed in particular to elements forming part of, or cooperating more directly with, apparatus in accordance with the invention. It is to be understood that elements not specifically shown or described may take various forms well known to those skilled in the art.

In the description and claims that follow, the term "invisible" or "substantially invisible" uses the conventional meaning, that is, not perceptible to the unaided human eye. A light source that is substantially invisible may even emit a small portion of light at a wavelength that might be dimly perceptible by a human viewer, particularly in an otherwise dark environment. However, such a source would be expected to emit the substantial portion of its light energy at wavelengths outside the visible spectrum. In the context of motion picture projection, visible light projected onto the screen at high intensities (i.e., the projected movie) would render a substantially invisible light source as not perceptible to a viewing audience.

One important principle used by the apparatus and method of the present invention is the sensitivity of a standard video camera to light outside the visible spectrum. It is instructive to note that visible light is within the range from about 400 nm to just under 700 nm, based on well-known spectral sensitivity of the human eye. In order to provide suitable images, video camera sensors are designed to emulate, in so far as possible, human eye response. However, the inherent spectral sensitivity of a silicon detector used in the CCD image sensor component of a conventional video camera differs from that of the eye. For a typical CCD device, for example, the silicon detector is sensitive to radiation from ultraviolet (UV) light (approximately 300–400 $\mu$m), which is below the wavelength of human perceptibility. Correspondingly, the silicon detector is also sensitive to light in the infrared range (from 700–1000 nm), which is above the wavelength of human perceptibility. Because of this broadened sensitivity, the video camera records some stray UV or IR light from outside the visible range during normal operation, in spite of an amount of filtering that is routinely provided by the video camera manufacturer. Normally, any added UV or IR light content is minimal and can be ignored as "noise". However, intense illumination by UV or IR sources is recorded by video camera devices and can be used for watermarking.

Since both IR and UV radiation are invisible, it may make no difference whether one or the other is used for the purpose of generating a copy-deterrent pattern, whether using a watermarking message or image-obscuring pattern. However, if only one or the other were used, a video camera could be provided with additional filtering that attenuates the IR or UV light. It is a goal of the present invention to make it difficult for a video camera user to defeat any watermark or copy-deterrent pattern implementation through use of a filter. Therefore, the preferred embodiment of the present invention uses both IR and UV light, which can be projected at the same time or, if advantageous, in an alternating fashion. As is described subsequently, image content can be used to determine whether IR or UV source is preferred for a specific frame, for a specific area within a frame, or for a specific pixel within a frame at a given time.

The goal of the present invention is to display a pattern on a screen that displays a visually observable motion picture work, where the displayed pattern is invisible to the human viewer but can be recorded by a video camera. The displayed pattern supported by the apparatus and methods of the present invention could be, for example, any of the following:

(a) A digital watermark that provides information on or proof of ownership authentication for the motion picture owner or distributor or that provides a copy control management function. Such a displayed pattern might be difficult to detect even when filmed from the screen using a video camera, as is common for some users of digital watermarks. Often, digital watermarks of this type are intentionally disguised as a noise pattern in the spatial or frequency domain. A spread spectrum technique, as is well known in the digital watermarking arts, could be applied to make the digital watermark very difficult to detect and remove by an unauthorized individual. Special scanning and decryption techniques might even be required in order to detect and decode such a digital watermark. Depending upon the recorded intensity of the watermark pattern, a digital watermark of this type might not serve well as an aggressive copy deterrent, but it would still have identifying and authentication uses for some applications. Such a watermark could also serve to indicate tampering or modification of a digital motion picture data stream;

(b) A digital watermark that provides a human-readable marking giving identification or authorization information; or (c) A copy-deterrent pattern that includes a human-readable message such as a warning message or reward message, source or theater identification, date/time stamp, or animation, for example.

(d) A copy-deterrent pattern that has the specific purpose of degrading or obscuring a copied image, thus making a video camera copy that is of low value or is entirely unusable. Some types of copy-deterrent patterns, described subsequently, would also serve to frustrate digital image compression algorithms.

It is instructive to note that while the preferred embodiment of the present invention is directed to digital motion pictures, the apparatus and method of the present invention can also be applied, in a broader way, to conventional motion pictures that are distributed on and displayed from film. With digital motion picture technology, the present invention takes particular advantage of the ability to determine and to control the precise color and intensity characteristics of each individual pixel in a frame comprising an array of pixels. However, because a primary intent of the present invention is to discourage recording of a projected motion picture using a video camera, which is a digital device, the methods and apparatus disclosed and claimed herein have applicability to both digital and conventional film-based motion pictures.

Apparatus Configurations for Digital Motion Picture Projection

Referring to FIG. 1, there is shown an arrangement of components for a copy-deterrent apparatus for the preferred embodiment of the present invention, the apparatus generally numbered 10. A movie data source 12 provides the data for the digital motion picture work. Digital motion picture data can originate from a transmission channel (not shown) or from a high-capacity storage medium such as an optical disk or magnetic tape, for example. Movie data source 12 provides any necessary data decryption and decompression, then provides frame-by-frame image data to a display logic processor 14. Display logic processor 14 provides the frame data to a frame projector 16 for display on a screen 18. Projector 16 can employ any of a number of types of projection components adapted to modulate light as an array of pixels such as, for example, a reflective or transmissive LCD array. Alternately, projector 16 could provide source light that is modulated using micromirror technology, such as digital micromirror device (DMD) technology.

It is instructive to note that digital motion picture frame data provided to frame projector 16 is an array of image pixels, typically in three composite color planes (Red, Green, and Blue, RGB). Projector 16 projects the image data as individual pixels. Pattern generator 44 instructs IR source projector 20 and UV source projector 22 to illuminate suitable regions that provide the watermark or copy-deterrent pattern, on a frame-by-frame basis. Each illuminated region that is produced by source projectors 20 and 22 may be the same size as an individual projected pixel of projector 16, or it may be larger or smaller.

Figure 2:
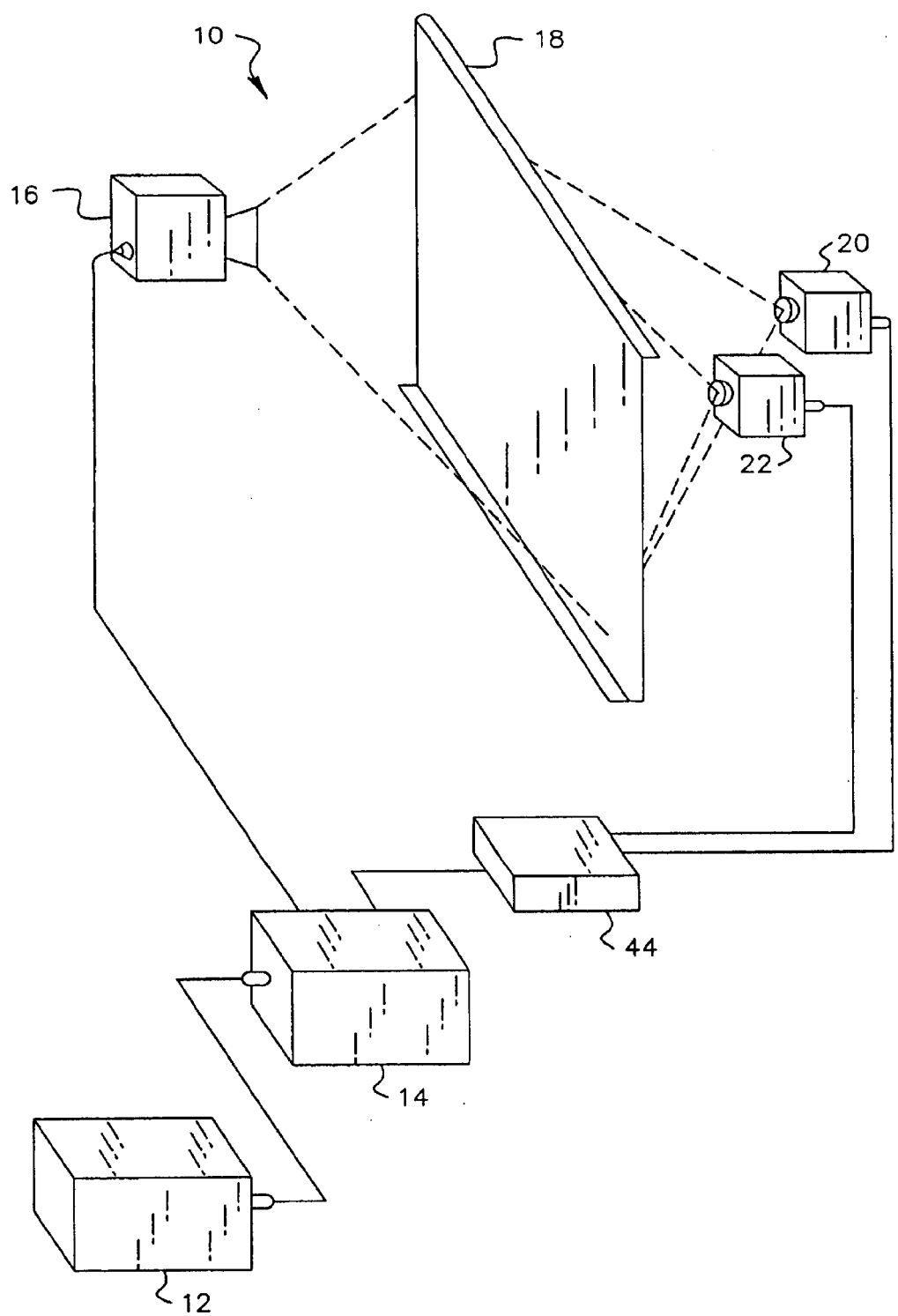
FIG. 2 is a schematic view showing placement of projector components in an alternate embodiment.

Referring to FIG. 2, there is shown an alternate arrangement in which IR source projector 20 and UV source projector 22 are positioned at the rear of screen 18 (relative to the image projected by frame projector 16). This alternate arrangement may be advantageous for optimizing the displayed intensity available from UV and IR sources. This arrangement takes advantage of existing tiny perforations in screen 18, provided for audio.

Figure 3:
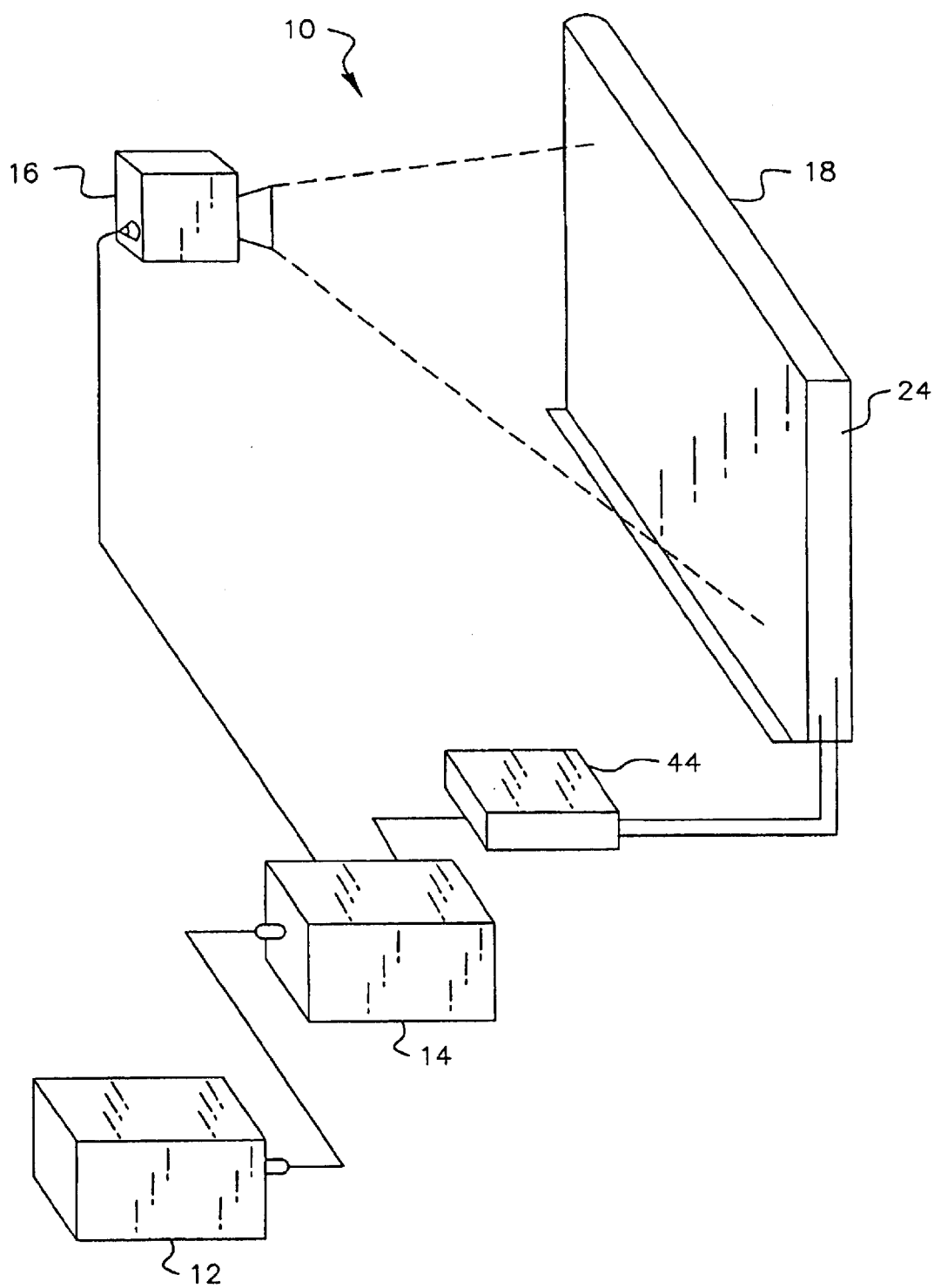
FIG. 3 is a schematic view showing an LED array used to display an IR and UV pattern in an alternate embodiment.

Referring to FIG. 3, there is shown another alternate arrangement for displaying a pattern using UV or IR illumination from an LED array 24. LED array 24 could have any number of possible arrangements of LEDs emitting UV and IR light through screen 18, with all LEDs under the control of display logic processor 14.

Figure 4:
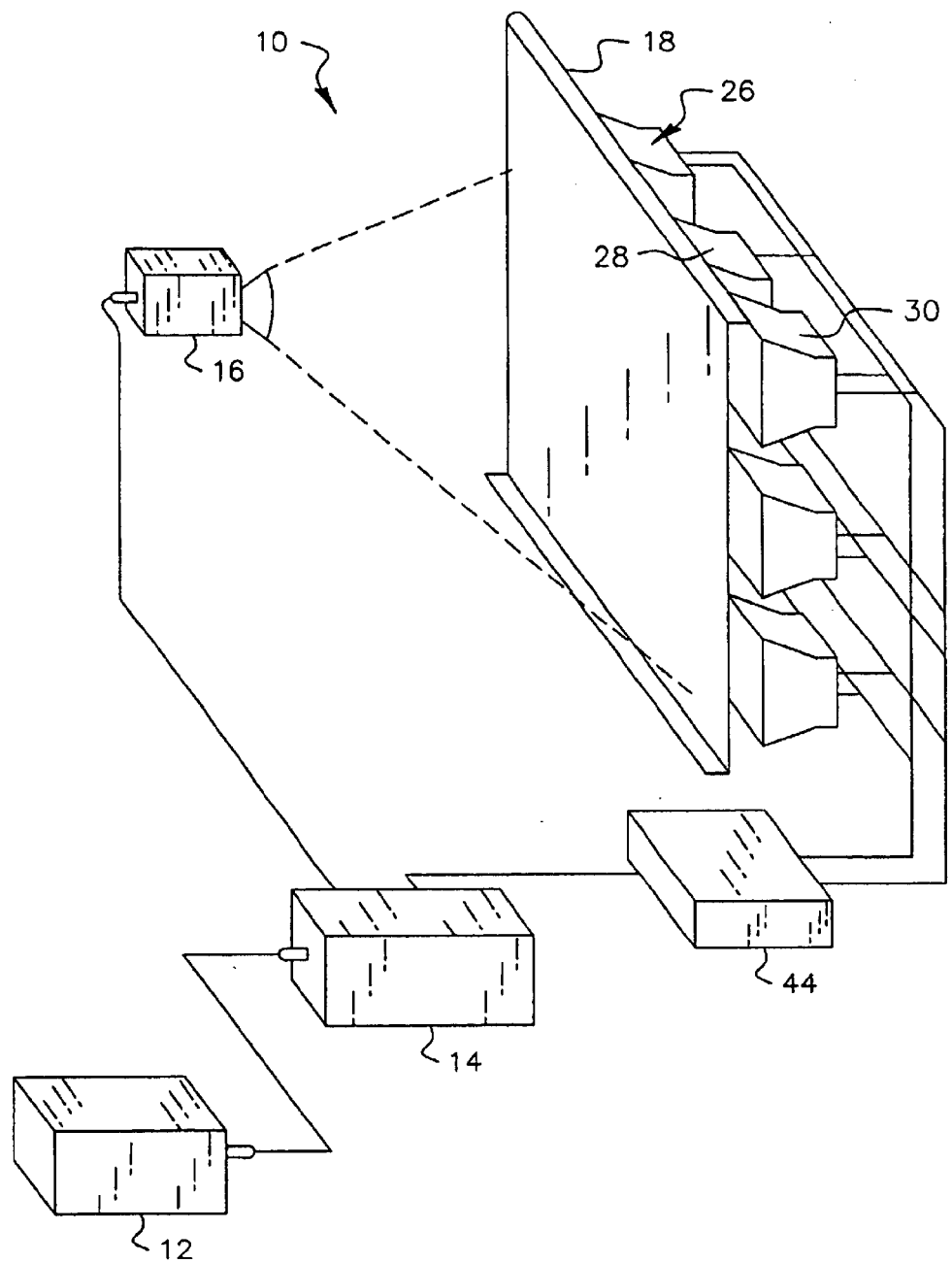
FIG. 4 is a schematic view showing a bank of UR and IV light sources provided to display a watermark or copy-deterrent pattern.

Referring to FIG. 4, there is shown yet another alternate arrangement for displaying a pattern using UV or IR illumination from a bank of light sources 26 that comprises one or more IR sources 28 and one or more UV sources 30.

Figure 5:
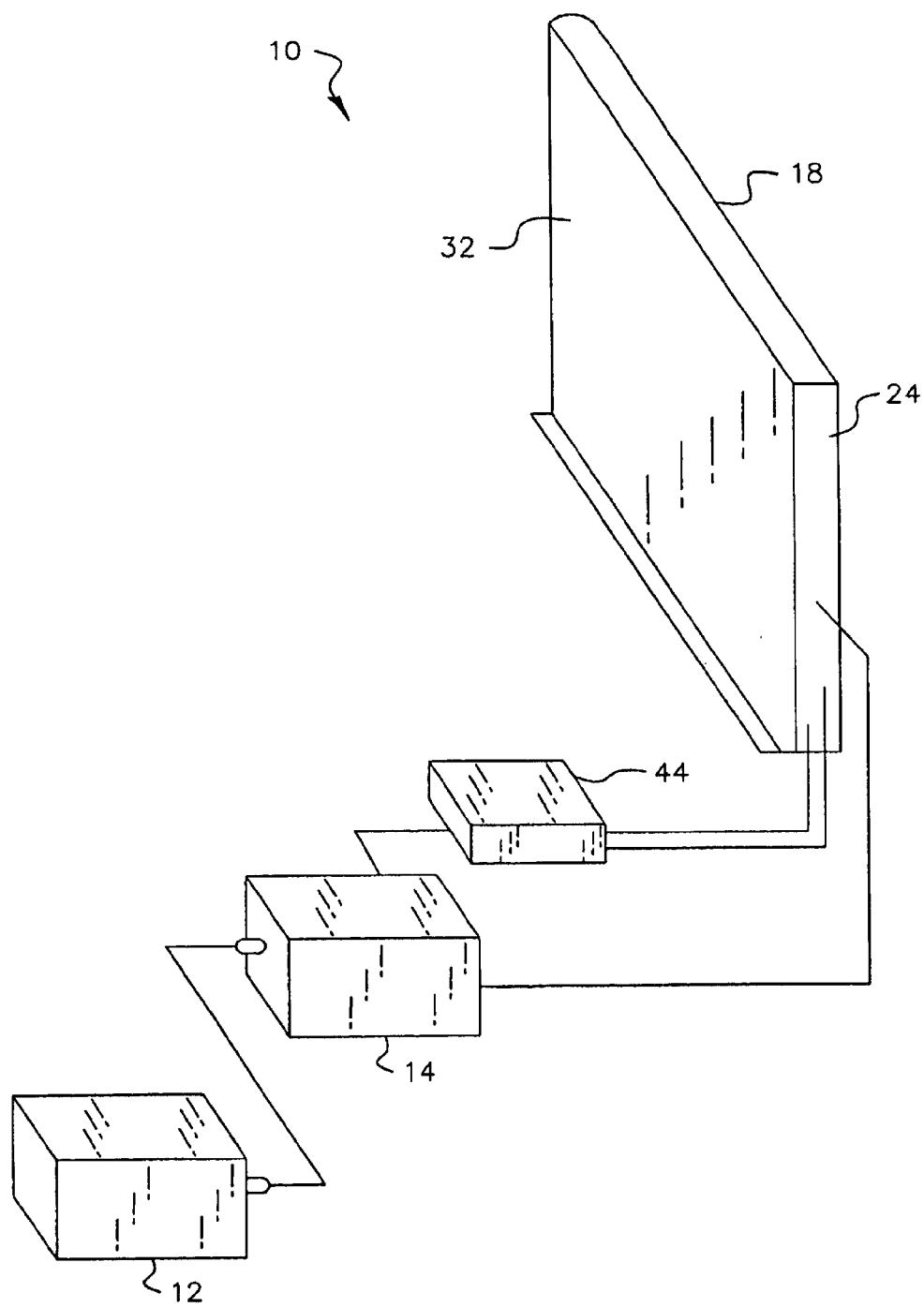
FIG. 5 is a schematic view showing an alternate projection screen arrangement using the pattern display apparatus of the present invention.

Referring to FIG. 5, there is shown yet another embodiment in which projector 16 is not used, where screen 18 is in the form of a panel that comprises LED array 24. With this type of display screen 18, such as the familiar flat-screen display commonly used in large sports facilities for example, individual LEDs 32 emit light having the needed color to display an image on screen 18. Using screen 18 of this type, display logic processor 14 directly controls LEDs 32 in LED array 24 for visible display, where LEDs 32 emit red, green, and blue components of an image. Pattern generator 44 also controls LEDs 32 or similar light sources that emit invisible UV or IR light for watermark or copy-deterrent patterns as used in the present invention.

IR and UV source projectors 20 and 22 could be implemented using a number of different approaches, depending on cost, size, and configuration constraints. Either or both IR and UV source projectors 20 and 22 could simply employ a broadband light source with appropriate filters so that only the IR and the UV portions of the broadband light are projected onto the screen 18. One or both IR and UV source projectors 20 and 22 could alternately be optional, for example, where frame projector 16 itself comprises a broadband light source. Using well-known techniques in the optical arts, either or both IR and UV light components could be separated from a broadband light source and redirected onto screen 18 to produce a desired pattern.

Alternate Apparatus Configurations for Film-Based Motion Picture Projection

For a conventional motion picture on film, frame projector 16 would not receive source image data from display logic processor 14. Instead, a conventional film reel loaded within frame projector 16 would provide the motion picture image content, displayed using methods well-established in the motion picture display art. One or both IR and UV source projectors 20 and 22 could alternately project a watermark or other copy-deterrent pattern onto the screen on top of the projected film frame. Such a watermark or copy-deterrent pattern may simply be projected onto the screen as a static (constant) pattern or as a time-varying pattern that changes with or without synchronization with the projected movie frames. Since in a conventional film projection system individual frames are projected in a sequential order, it is possible to obtain a synchronization signal that indicates start of a frame display. Such a signal is often used for synchronization of the audio and sound track signals with the motion picture. The above mentioned frame synchronization signal may further be used to synchronize the projection of the UV and IR copy-deterrent or watermark patterns (or both) with the displayed film frame. Furthermore, the UV and IR copy-deterrent or watermark patterns (or both) may be altered from one frame to another.

Pattern Display

Figure 6:
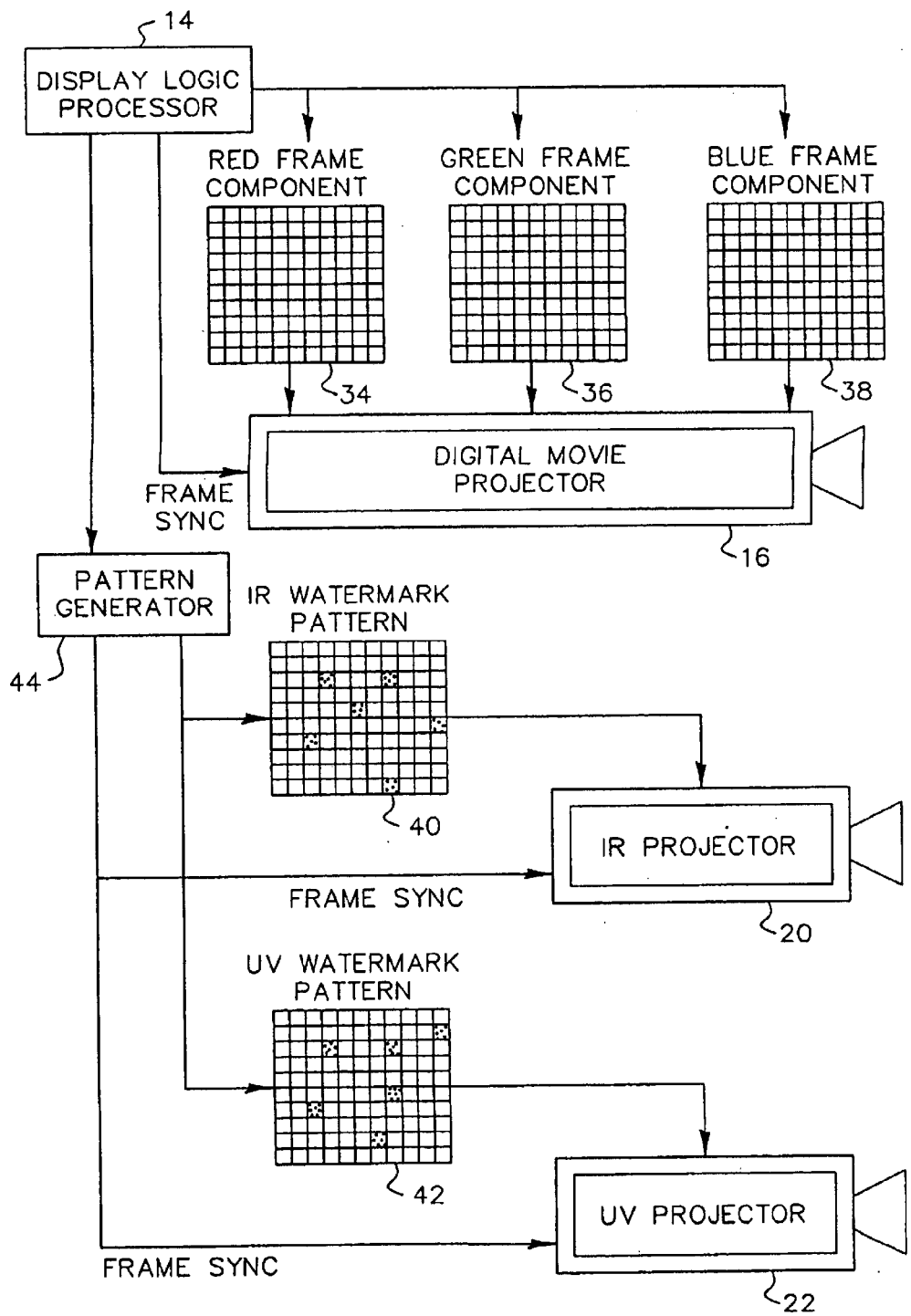
FIG. 6 is a schematic view showing projection of IR and UV patterns along with motion picture red, blue and green frame components.

FIG. 6 further illustrates the concept of UV and IR pattern projection onto a motion picture screen 18 for a digital movie projection system for the preferred embodiment depicted in FIG. 1. A digital motion picture frame, which is typically comprised of a rectangular array of pixels, is separated into 3 color components: red frame component 34, green frame component 36 and blue frame component 38. All three color components of individual pixels are simultaneously projected onto the screen 18 via a digital movie projector 16 that is controlled by the display logic processor 14. If the addition of IR and UV watermark or copy-deterrent patterns is desired, a separate IR pattern 40 and UV pattern 42 may be generated via the pattern generator 44 and subsequently displayed on the screen 18 via the IR projector 20 and the UV projector 22, respectively. The IR and UV patterns may be projected simultaneously or on a delayed basis with respect to the red, blue, and green components of the motion picture frame. The timing synchronization between the colored and UV and IR components of each frame is controlled by the display logic processor 14 and the pattern generator 44.

Using any of the arrangements of FIGS. 1 through 5, a number of straightforward pattern display approaches are possible. As one approach for creating a copy-deterrent pattern, one or both IR and UV projectors 20 and 22 (FIGS. 1 and 2) or IR- or UV-emitting LEDs 32 in LED array 24 (FIGS. 3 and 5) could be used to display a message that is substantially invisible to a human observer, but will be recorded by a video camera. This could be, for example, a copy-deterrent copyright warning message including reward information or an identifying message giving the theater name and a date and time stamp. Alternately, any of the sources shown in FIGS. 1 through 5 could be used to display a digital watermark pattern. The watermark pattern can be generated using one of a number of methods that have been described in the prior art, e.g., the method as described in U.S. Pat. No. 6,044,156 (Honsinger et al.). As described in U.S. Pat. No. 6,044,156, the watermark pattern is added directly to the digital image data which is entirely representative of components in the visible part of light spectrum when such data is displayed, whereas the present invention displays the watermark pattern onto the motion picture screen using the IR and UV light sources. As another alternative for creating a copy-deterrent pattern, projectors 20 and 22, LED array 24, or bank of light sources 26 could project a pattern of "blurring" or "obscuring" UV or IR frames that distort any video camera recording. Patterns of UV or IR "noise", when combined or overlaid with the visible movie frames from projector 16, would be imperceptible to movie viewers. However, this type of noise would be sensed and recorded by a video camera filming directly from screen 18, thereby distorting or obscuring significant portions of the recorded movie frames.

The IR and UV patterns could be time-varying, controlled by pattern generator 44, or static, such as provided using masks or slides. Alternately, patterns could comprise a combination of time-varying and static components. The said IR and UV patterns may be displayed for only a fraction of the duration of a movie frame and/or the entire duration of a movie frame, which is typically $\frac{1}{24}$ or $\frac{1}{30}$ second, and/or more than the duration of one movie frame. Furthermore, the said IR and UV patterns may be displayed with or without synchronization with the displayed movie frame. In all cases, the timing and configurations of the patterns could be computed either prior to display or at the time of display. Moreover, it is entirely possible that the information for the pattern generation could be contained as ancillary digital data in the movie data source 12 of FIG. 1, and this ancillary data could be used to control pattern generator 44.

The novel use of both IR and UV light projection makes it very difficult and expensive for a video camera operator to compensate for any watermark or copy-deterrent pattern effects by using a filter. It is well-established in the optical arts that it would be difficult to develop or obtain a filter that would be capable of effectively blocking IR light without, at the same time, blocking some amount of red light at the upper end of the visible spectrum. That is, a filter capable of blocking the IR light would also, by blocking some of the visible red light, effectively degrade the quality of the recorded image. Correspondingly, if filtering were provided for UV light at the other end of the visible spectrum, the same imperfection in filter response would occur. Thus, with watermark and copy-deterrent patterns projected from outside both ends of the visible spectrum, as in the present invention, a video camera operator would face a difficult filtering problem that, if it were feasible, would prove prohibitively costly. Moreover, filters would normally attenuate the brightness of captured scenes in the visible spectrum, with disappointing results for the viewer of an illegal copy of the movie.

The general approaches described above for projecting watermarks and copy-deterrent patterns from both IR and UV sources could, therefore, be used effectively to discourage copying activity. However, it is a goal of the present invention to provide further improvements to these watermarking and copy-deterrent approaches, as is described below.

Using Spectral Content of Each Image Frame

As is noted above, it may be advantageous for watermarking or copy deterrence to coordinate projection of IR and UV sources with projection of a frame of motion picture content from projector 16. For example, to prevent effective use of an IR-blocking filter on a video camera, one novel strategy for copy deterrence is to replace or, more preferably, overlap some of the image areas or pixels having high red content with image areas or pixels having IR content at a wavelength that is very close to the visible red threshold. This strategy minimizes the usability of a filter, since, as noted above, any filter capable of blocking IR energy would also necessarily attenuate some of the red content of the frame. Likewise and preferably in combination with the above noted IR strategy, a strategy for preventing the effective use of a UV-blocking filter would be to replace or more preferably overlap image areas or pixels having high blue/violet content with image areas or pixels having UV content at a wavelength that is very close to the visible violet threshold.

To illustrate the use of spectral content of an image as a factor in determining whether IR or UV projection would be most effective for watermark or copy deterrent display, consider the following two examples:

(a) A sunset scene would tend to contain relatively high levels of light at the upper (red) end of the visible spectrum. Selectively projecting IR light, at wavelengths very near the visible red threshold, to pixels in the form of a watermark or copy-deterrent pattern defeats the usability of a filter, since any filter capable of blocking the IR content would also attenuate red color pixels, resulting in a very poor copy.

(b) A scene having substantial violet content would tend to contain relatively high levels of light at the lower (blue/violet) end of the visible spectrum. Selectively projecting UV light, at wavelengths very near the visible violet threshold, to pixels in the form of a watermark or copy-deterrent pattern defeats the usability of a filter, since any filter capable of blocking the UV content would also attenuate violet color pixels, similarly resulting in a very poor copy.

This method has special advantages for digital motion picture protection. Because the color content of a digital motion picture is available to display logic processor 14 as digital data (such that the color content of each individual displayed pixel is known), the strategic selection of IR or UV signals can be done on a pixel-by-pixel basis. This capability allows a number of possibilities for projecting watermark or copy-deterrent patterns, including the following:

(a) Dynamic, frame by frame modification of pixel state. The pixel locations at which UV or IR light are displayed can be changed randomly with each successive frame. Such a scheme, for example, would make it difficult to perform image editing to remove or minimize any watermark or copy-deterrent pattern.

(b) Alternating projection of IR and UV light. By alternating, or randomly alternating, projection of a watermark or copy-deterrent pattern to individual pixels between IR and UV light sources, the pattern can be made inherently very difficult to filter. Any attempt to filter pixels from both ends of the spectrum at the same time will have undesirable side effects on copies of visible pixels.

(c) Animation of warning or copyright notice messages. An animated warning or copyright message, or any animated image pattern, can be projected to pixels using UV or IR sources. Animated patterns used for watermarking or copy-deterrence can be exceedingly visually distracting and very difficult to remove. An animated digital watermarking pattern, not intended to be a visible pattern, could be extremely difficult for an unauthorized party to detect and could provide a highly secure watermark.

Figure 7:
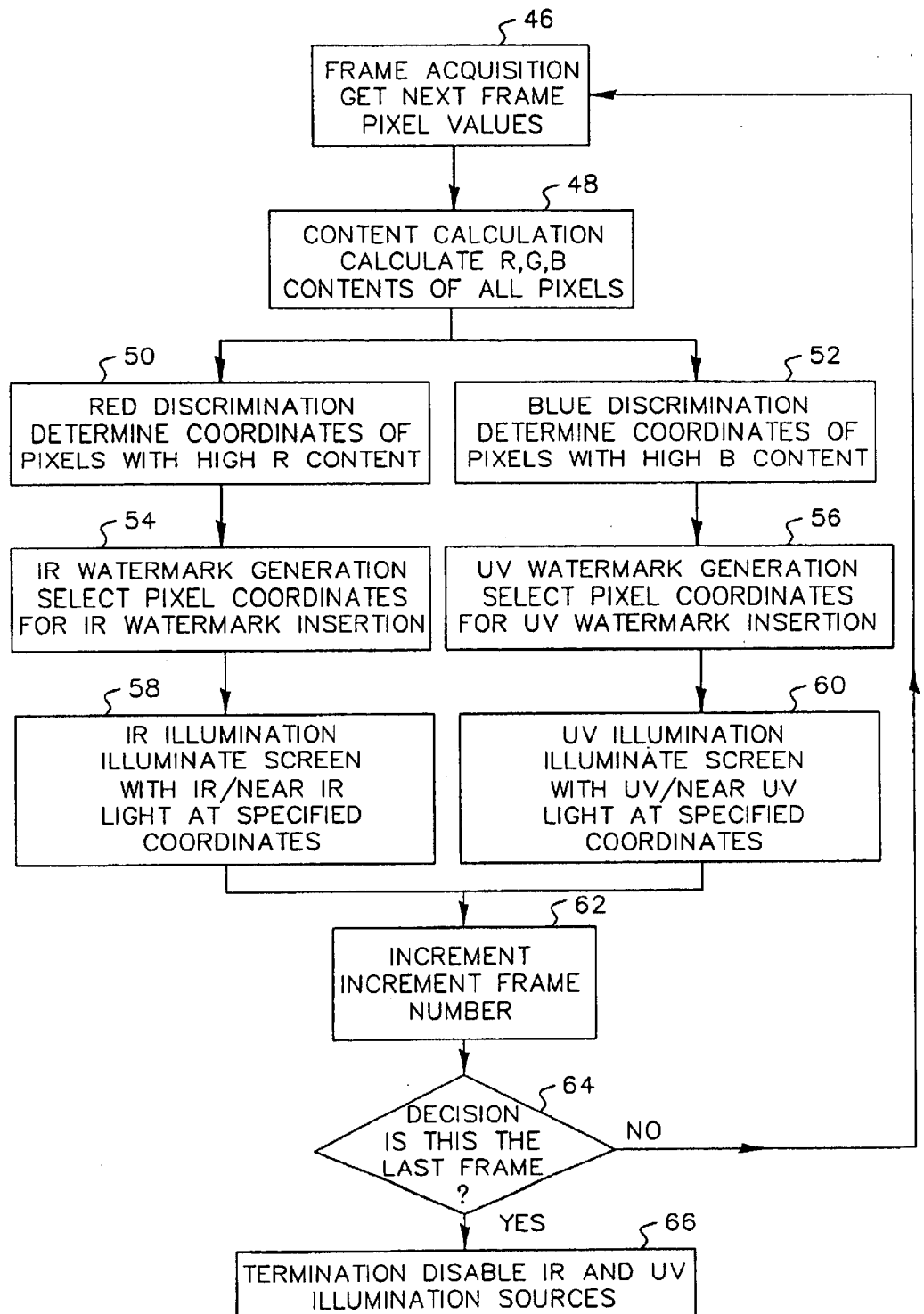
FIG. 7 is a flow chart showing steps involved in displaying a pattern onto portions of the screen with high red and blue spectral contents.

Referring to FIG. 7, there is shown a flowchart describing the process of watermark pattern generation for the portions of the individual movie frame with high IR and UV spectral contents. The process starts by frame acquisition step 46, where the frame pixel values are acquired. Next, the red, blue and green color contents of each pixel are calculated during the content calculation step 48. In the red discrimination step 50, the locations of pixels with high red content are determined. Simultaneously, the locations of pixels with high blue content are determined in the blue discrimination step 52. This is followed by IR watermark generation step 54 and UV watermark generation step 56 where the coordinates of the desired IR and UV watermark pixels are calculated, respectively. Next, the screen is illuminated with IR or near IR light and UV or near UV light at the specified coordinates during the IR illumination step 58 and UV illumination step 60. During the increment step 62, the frame number is incremented and, in the decision step 64, checked to see if the projected frame is indeed the last frame of the motion picture. If there are more frames to be shown, the process repeats itself by acquiring the pixel values of the next frame in frame acquisition step 46. Otherwise the process is ended in the termination step 66 where the IR and UV light sources are disabled.

Use of IR or UV Interference to Frustrate Video Compression Algorithms

As described above, a copy-deterrent pattern can be displayed in order to directly degrade or obscure image content. However, even further copy protection can be achieved, for both conventional film-based and digital motion pictures, by displaying patterns that specifically thwart the compression processes that are commonly used in digital video cameras. Specifically, many video cameras employ MPEG compression for storing video frames compactly on a storage medium. Video frames comprising many megabytes of raw image are routinely compressed with high efficiency, so that a camera user can store 45 minutes or more video content on a single video tape. By reducing the efficiency of compression algorithms, the techniques disclosed below require that anyone illegally filming a digital motion picture from the screen would need to switch tapes much more frequently, making it difficult to obtain a copy that is without excessive interruptions and missed material. Moreover, a reduction in the compression efficiency may also lead to a copy that is significantly degraded in quality, thus lowering the potential value of the illegal copy.

To understand how the present invention can impact compression efficiency, it is instructive to review some basic components of a video compression scheme. In particular, consider MPEG compression, since this method is commonly used in video capture devices. As one way to minimize data storage requirements, compression techniques such as MPEG do not store each successive frame as a completely independent unit. Instead, MPEG and related techniques store certain frames as independent I-frames (intra-coded pictures) and subsequently calculate dependent P-frames (predicted pictures) and B-frames (bidirectional predicted pictures), with difference information, based on motion compensation and prediction, relative to previously transmitted I-frames and/or P-frames. The purpose of these various frame types is to take advantage of temporal redundancy, where consecutive frames in an image sequence are often very similar in content. In this type of coding scheme, B-frames are compressed with high efficiency, P-frames are compressed with somewhat less efficiency, and I-frames (because of their independent encoding) are compressed with least efficiency.

In MPEG compression, I-frames are DCT-encoded (Discrete Cosine Transform) in similar fashion to JPEG images. The basic steps in DCT encoding are: 1) perform a DCT operation on 8×8 blocks of pixels to produce transform coefficients, 2) quantize the transform coefficients, and 3) Huffman-encode the quantized transform coefficients. As is well-known in the image compression art, the compression efficiency that is achieved by this process is dependent upon both the image content and the amount of quantization. An image that contains a significant amount of high frequency information content requires more bits than an image with little high frequency content. Likewise, minimizing quantization produces a large number of bits, while increased quantization produces fewer bits. The trade-off is that increased quantization also yields lower image quality. In a system performing image compression, quantization can be used to control the bit rate, to control the image quality, or to control a combination of both.

For P-frames and B-frames, the encoding process includes an additional step of forming motion-compensated prediction errors. These errors are transformed using the DCT, and then quantized and Huffman-encoded as before. Where there is only a relatively small amount of change or motion between successive frames, predictive encoding of B- or P-frames results in good compression efficiency since the prediction errors are small. However, as soon as there is any substantial change from one frame to the next, the corresponding portions of the B- or P-frame will have large prediction errors. These large errors require more bits for their representation. Moreover, large changes from frame to frame often require more bits in order to represent the motion vectors that are needed for the motion compensation process. In many cases, an increase in bits for affected regions can even cause an MPEG encoder to switch from the more efficient predictive encoding to the less efficient intraframe encoding in those regions, thereby requiring a significant number of additional bits. As a result, substantial change in image content from frame to frame tends to produce either an increase in the overall bit rate, or a decrease in image quality (if quantization is increased to keep the bit rate at a relatively constant level), or both. Thus, it is an object of this invention to frustrate efforts to make an illegal copy, so that such a copy would either require excessive amounts of storage media or would be of disappointing quality or, possibly, would exhibit both of these shortcomings.

In light of the above summary of MPEG compression, the present invention allows the inherent nature of MPEG compression (as well as similar video compression methods) to be exploited for the purpose of copy deterrence. There are two basic methods for exploiting MPEG for this purpose:

(a) Adding additional, invisible image patterns to each frame. As mentioned previously, image content (particularly at high frequencies) greatly affects the compression efficiency of the I-frames. To substantially expand the amount of storage needed for a video recording, the present invention adds additional structure or noise to the image by displaying patterns from the IR and UV sources. Again, the latent IR and UV patterns are not visible to an audience, but are captured by the video camera. In MPEG compression, a luminance/chrominance image representation is used (as opposed to RGB), and it is advantageous to affect both the luminance and chrominance channels by this method. This can be accomplished, for example, by displaying the same pattern simultaneously with both the IR and UV sources, as opposed to using only one or the other invisible light sources. Using only one source for any given frame still affects the signal content, but the effect may be primarily in one or the other chrominance channels, which will not reduce the compression efficiency as much as would be achieved using both sources simultaneously. These displayed patterns could take the form of a random noise field, or they could consist of isolated spatial frequencies or combinations of frequencies. It is worthwhile to note that some video cameras use compression techniques that use only I-frames (e.g., motion JPEG). For such video devices, the technique just described will also affect their coding efficiency in the same way that an MPEG-based system is affected. In many video recording devices, there may also be a rate control mechanism that attempts to maintain a relatively constant bit rate. By adding additional image content, the rate control mechanism is forced to increase quantization to maintain the constant bit rate, and image quality is greatly reduced because of the increased quantization. Thus, the net result of adding the additional image structure is that the storage requirements are increased, or the image quality is decreased, or both.

(b) Changing the image content from frame to frame. MPEG achieves much of its compression efficiency by exploiting the redundancy of consecutive frames. The more similarity there is between consecutive frames, the more efficient the compression. Conversely, the more differences there are from frame to frame, the less efficient the compression. As mentioned above, this decreased efficiency results because additional bits are required in order to encode prediction errors and motion vectors, or more regions must be encoded with the less efficient intra-coding mode. To deliberately make compression of a copy inefficient, UV and IR sources, such as projectors 20 and 22 or UV- or IR-emitting components in LED array 24, can be used to project a watermark or copy-deterrent pattern, not visible to human viewers but detectable by a video camera, that changes substantially from one frame to the next. This pattern could be a noise field that changes randomly from frame to frame, or it could be a more structured pattern that changes randomly or deterministically for each consecutive frame. Even a simple change in the overall recorded illumination level (which could be achieved by globally varying the displayed intensity of the UV and IR sources) is known to cause degraded performance in MPEG encoders by adversely affecting the motion estimation process. As mentioned above, it may be advantageous to display the same pattern using both the IR and UV sources simultaneously to impact the luminance and chrominance channels to the maximum extent, but alternating the display of the UV and IR sources for consecutive frames will also affect coding efficiency. As it senses the displayed result (which is, again, not visible to the viewing audience) a video camera using MPEG or similar compression would respond by repeatedly using more bits and/or increasing the quantization within B-frames and P-frames. Again, the result is that the corresponding amount of MPEG data generated for a motion picture that has been illegally copied from the screen will require substantially more storage media, or its image quality will be greatly decreased, or both.

While the above description specifically identifies JPEG and MPEG compression schemes, it must be noted that the above method also similarly frustrates other image compression schemes that utilize the temporal and spatial redundancy of motion frames in order to compress image data. The above method also has a negative impact on compression schemes that decompose an image into frequency bands using methods other than DCT (for example, wavelet decomposition).

While the invention has been described with particular reference to its preferred embodiments, it will be understood by those skilled in the art that various changes may be made and equivalents may be substituted for elements in the preferred embodiments without departing from the scope of the invention. For example, the projector configuration shown in FIGS. 1 through 4 could allow a single device to project any combination of the visible and invisible light sources to the screen. In addition to using UV and IR light, some combination of light sources just within the upper or lower visual threshold wavelengths could be used, possibly supplemented by IR or UV watermark or copy-deterrent patterns. The present invention is adaptable to a number of possible configurations of digital motion projector and display screen apparatus, such as using micromirror technology or a light valve array, for example.

Therefore, what is provided is a pattern display apparatus for digital motion pictures and a method for marking a displayed motion picture image in order to discourage recording of the image using a video camera.

The invention has been described in detail with particular reference to certain preferred embodiments thereof, but it will be understood that variations and modifications can be effected within the spirit and scope of the invention.

Parts List

10. Copy-deterrent apparatus
12. Movie data source
14. Display logic processor
16. Frame projector
18. Screen
20. IR source projector
22. UV source projector
24. LED array
26. Bank of light sources
28. IR source
30. UV source
32. LED
34. Red component of motion picture frame
36. Green component of motion picture frame
38. Blue component of motion picture frame
40. Infrared watermark pattern
42. Ultraviolet watermark pattern
44. Watermark pattern generator
46. Frame acquisition step
48. Content calculation step
50. Red discrimination step
52. Blue discrimination step
54. IR watermark generation step
56. UV watermark generation step
60. IR illumination step
60. UV illumination step
62. Increment step
64. Decision step
66. Termination step

What is claimed is:

1. A pattern display apparatus for forming substantially invisible patterns within serially displayed motion picture image frames of a visually observable motion picture work that is displayed upon a display surface, the apparatus comprising:

(a) an infrared light source adapted to provide infrared light within or between displayed motion picture image frames of the motion picture work wherein said substantially invisible patterns comprise an image of the infrared light displayed on the display surface to obscure the displayed motion picture work to recording by a video camera sensitive to visible light and sensitive to infrared light and/or to ultraviolet light; and (b) an ultraviolet light source adapted to provide ultraviolet light within or between displayed motion picture image frames of the motion picture work, wherein said substantially invisible patterns comprises an image of ultraviolet light displayed on the display surface to obscure the displayed motion picture work to recording by the camera.

2. The apparatus of claim 1 wherein said invisible pattern is conditioned by encoded data.

3. The apparatus of claim 1 wherein said motion picture image frames each comprises an array of pixels and the infrared light source provides infrared light to a first plurality of individual pixels and the ultraviolet light source provides ultraviolet light to a second plurality of individual pixels.

4. The apparatus of claim 3 further comprising a display logic apparatus that is adapted to control the illumination of said first and second plurality of individual pixels in order to form said invisible patterns.

5. The apparatus of claim 1 wherein said infrared light source comprises a lamp.

6. The apparatus of claim 1 wherein said infrared light source comprises a filter that discriminates infrared light from other parts of the electromagnetic spectrum.

7. The apparatus of claim 1 wherein said infrared light source comprises an LED.

8. The apparatus of claim 1 wherein said ultraviolet light source comprises a lamp.

9. The apparatus of claim 1 wherein said ultraviolet light source comprises a filter that discriminates ultraviolet light from other parts of the electromagnetic spectrum.

10. The apparatus of claim 1 wherein said ultraviolet light source comprises an LED.

11. The apparatus of claim 1 wherein said infrared light source and said ultraviolet light source are energized to provide an invisible pattern in a same displayed motion picture image frame.

12. The apparatus of claim 1 wherein said infrared light source is disposed behind said display surface relative to a viewing audience.

13. The apparatus of claim 1 wherein said ultraviolet light source is disposed behind said display surface relative to a viewing audience.

14. The apparatus of claim 1 wherein said display surface is a projection screen.

15. The apparatus of claim 1 wherein said display surface comprises a plurality of LEDs.

16. A copy protection method for projecting, within a visually observable displayed motion picture work substantially invisible patterns, the method comprising:

(a) illuminating a display area featuring said motion picture work with ultraviolet light to obscure images of the motion picture work to recording by a video camera having sensitivity to ultraviolet light and/or infrared light; and (b) illuminating a display area featuring said motion picture work with infrared light to obscure images of the motion picture work to recording by said video camera.

17. The method of claim 16 wherein in step (a) a first plurality of pixels are illuminated within an image frame or between image frames of said motion picture work with ultraviolet light from an ultraviolet light source; and in step (b) a second plurality of pixels are illuminated within an image frame or between image frames of said motion picture work with infrared light from an infrared light source.

18. The method of claim 17 wherein said first plurality of pixels is illuminated on alternate image frames with respect to said second plurality of pixels.

19. The method of claim 17 wherein at least some of said first plurality of pixels and said second plurality of pixels illuminate substantially the same pixel locations on an image frame of the motion picture work.

20. The method of claim 16 wherein said substantially invisible patterns comprises a message.

21. The method of claim 16 wherein said substantially invisible patterns are conditioned by encoded data.

22. A copy-deterrent method of providing a marking of a visibly observable motion picture work that is projected onto a display surface, the method comprising:

(a) displaying a first substantially invisible pattern on said display surface, said first substantially invisible pattern illuminated using infrared light during display of the motion picture work; and (b) displaying a second substantially invisible pattern on said display surface, said second substantially invisible pattern illuminated using ultraviolet light during display of the motion picture work.

23. The method of claim 22 wherein either or both of said first substantially invisible and said second substantially invisible pattern is/are changed from frame to frame of said motion picture work in location on the display or in message or in pattern content or alternated from frame to frame to decrease compression efficiency of recording of the projected motion picture work.

24. The method of claim 22 wherein the step of displaying a first substantially invisible pattern comprises the step of displaying a digital watermark.

25. The method of claim 22 wherein said step of displaying a first substantially invisible pattern comprises the step of displaying a random noise pattern.

26. A method of providing copy deterrence of a visually observable displayed motion picture work, the method comprising an ordered repetition of the following steps for each frame of at least a substantial number of frames of the displayed motion picture work:

(a) projecting, in said each frame of said displayed motion picture work, a first substantially invisible pattern, said first substantially invisible pattern formed using light emitted at wavelengths outside the visible spectrum; and (b) projecting, in a next frame of said displayed motion picture work, a second substantially invisible pattern, said second substantially invisible pattern formed using light emitted at wavelengths outside the visible spectrum, whereby said second substantially invisible pattern is deliberately different in shape and/or intensity and/or position from said first substantially invisible pattern, so that an algorithm predicting motion from said each frame to said next frame is thereby rendered less efficient in recording the projected image of the displayed motion picture work.

27. The method of claim 26 wherein the step of forming the first substantially invisible pattern comprises the step of illuminating pixel locations with infrared light.

28. The method of claim 27 wherein the step of forming the second substantially invisible pattern comprises the step of illuminating pixel locations with ultraviolet light.

29. The method of claim 26 wherein said ordered repetition projects an animation.

30. The method of claim 26 wherein the step of forming a first substantially invisible pattern further comprises the step of forming a first substantially invisible pattern comprising high-frequency image content, thereby reducing the efficiency of DCT coefficient quantization.

31. The method of claim 26 wherein the step of forming a first substantially invisible pattern further comprises the step of simultaneously illuminating pixel locations with both infrared light and with ultraviolet light.

32. The method of claim 26 wherein image areas of a frame of said displayed motion picture work having levels of high red content are overlapped with areas or pixels having infrared light content that is substantially invisible.

33. The method of claim 26 wherein image areas of a frame of said displayed motion picture work having high blue and/or violet content are overlapped with image areas or pixels having ultraviolet light content that is substantially invisible.

\* \* \* \* \*